May 22, 1934.  L. BOUDIN  1,960,136
MEANS FOR OBSTRUCTING THE FLOW OF MOLTEN GLASS
Filed Dec. 6, 1928   2 Sheets-Sheet 1
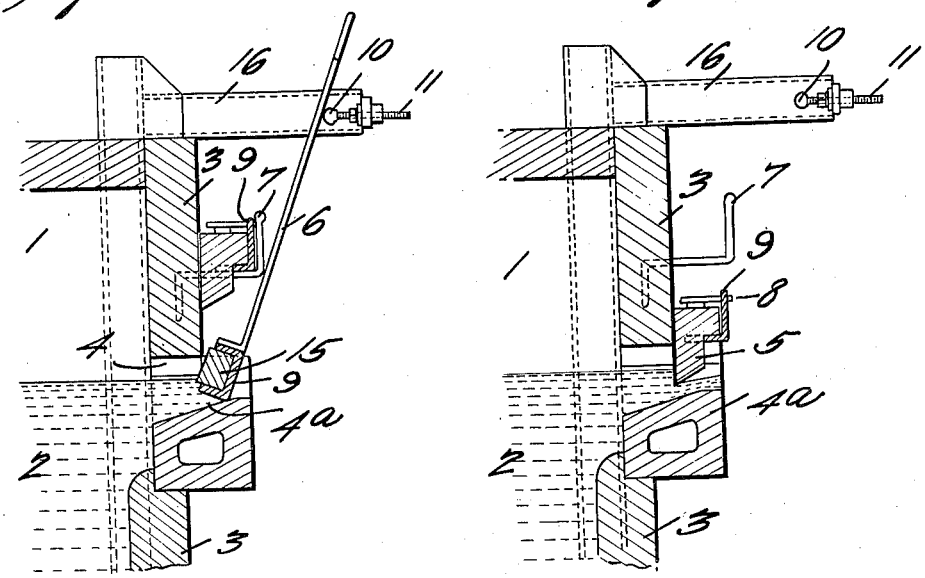
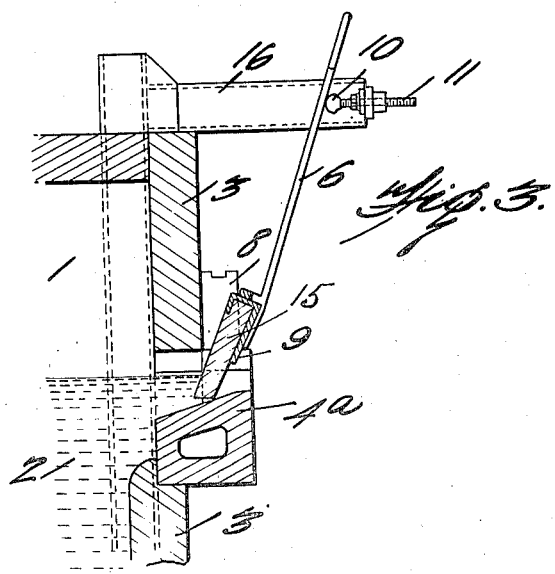
INVENTOR.
LOUIS BOUDIN,
BY
ATTORNEYS.

May 22, 1934.　　　　L. BOUDIN　　　　1,960,136
MEANS FOR OBSTRUCTING THE FLOW OF MOLTEN GLASS
Filed Dec. 6, 1928　　　2 Sheets-Sheet 2
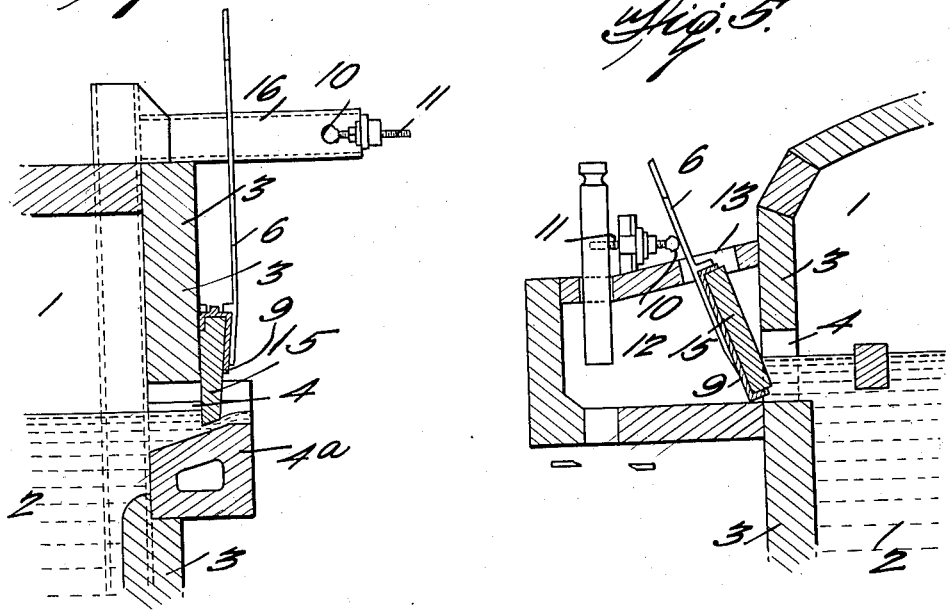
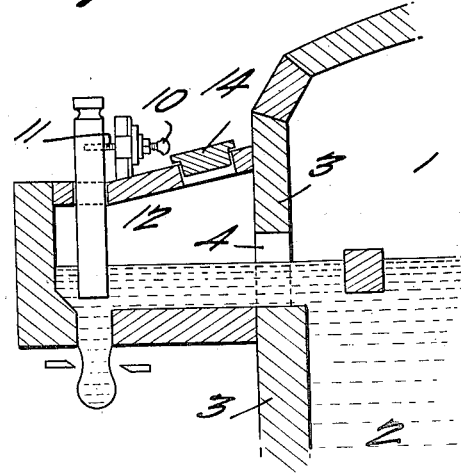
INVENTOR.
LOUIS BOUDIN
BY
ATTORNEYS.

Patented May 22, 1934

1,960,136

UNITED STATES PATENT OFFICE 1,960,136

MEANS FOR OBSTRUCTING THE FLOW OF MOLTEN GLASS

Louis Boudin, St. Gobain, France, assignor to Société Anonyme des Manufactures des Glaces & Produits Chimiques de Saint Gobain, Chauny & Cirey, Paris, France Application December 6, 1928, Serial No. 324,164
In France December 8, 1927

1 Claim. (Cl. 49—54)

This invention relates to means for obstructing a flow of molten glass and is of particular value for use in connection with glass melting furnaces in which glass is discharged through the side wall of a furnace, either directly to a forming device or to a forming device through a forehearth. There are times in which it is not desired to operate the forming device, and then it is desirable to stop the flow from the furnace. It is also desirable that when desired the flow may be quickly started again without the application of any special heating device.

Gates, often water-cooled, are well known in the art, but these have been inserted by dropping them in front of the flow opening in a vertical position. This means that when the glass congeals around the gate, it is impossible to withdraw the gate until some special means have been used to melt the solidified glass. This is because the water-cooled gate causes the glass to solidify and no proper means have been provided heretofore to control the temperature of the glass at the point of stoppage by the melting heat of the furnace.

I propose a construction in which a stopper can be placed in an inclined position in front of a horizontal flow opening, thus obstructing the flow of glass and at the same time having the upper part of the stopper away from the wall above the flow opening to allow the products of combustion to escape over the molten glass out of the flow opening and between the stopper and the wall of the furnace to regulate the viscosity of the obstructed glass. The amount of heat that is allowed to escape over the glass can be regulated by the inclination of the stopper and the viscosity of the glass be so controlled that it will not harden, but will be of such viscosity that leakage will not occur round and adjacent to the stopper.

Reference being now had to the accompanying drawings forming part of this specification,—

Figure 1 is a section through a vertical wall of the furnace showing a stopper obstructing the flow of glass in accordance with this invention.

Figure 2 is a similar view to Figure 1, but with a gate block regulating the flow opening of the furnace and with the stopper removed.

Figure 3 is a similar view of Figure 1 showing a combined stopper and gate block used as a stopper.

Figure 4 is a view of the device of Figure 3 with the combined stopper and gate block used as a gate.

Figure 5 is a section through a furnace having a forehearth in which is contained a stopper embodying this invention; and Figure 6 shows the stopper removed, thus allowing the molten glass to flow to the forming device.

1 is a glass furnace containing a body of molten glass 2. In the vertical wall 3 of the furnace is a flow opening 4, having a flow block 4ª, on which may rest the stopper 15 of refractory material when it is desired to obstruct the flow of molten glass. In Figure 1 and 2 I show at 7 a bracket firmly secured in the vertical wall 3 of the furnace on which the usual gate block 5 can be placed when raised out of the glass. Below this upper bracket is another bracket 8 (Figure 2) to hold the gate block 5 when the same is lowered to form the upper lip of the flow opening, so as to regulate the depth of the glass which flows from the furnace.

In the form of the invention shown in Figures 3 and 4, a slightly different shape of stopper is shown because the stopper 15 in these figures can be used as the upper lip of the flow opening, i.e., as a gate block, as is shown in Figure 4.

In the form of stopper used in Figures 1 and 5, the stopper is bound on three sides by a metal frame 9, while in Figures 3 and 4 the combined stopper and gate block is also bound on three sides, but the binding does not extend down as far on this combined implement so that when it is used as a gate block, the molten glass will not be in contact with the metal. In all of the forms, except Figure 2, the stopper or combined stopper and gate block has a handle 6 securely attached to the metal frame 9, which partially binds the stopper and gate blocks, so that the same can be readily handled and the vertical inclination of the stopper and of the combined stopper and gate block can be regulated when the same is used as a stopper.

In Figures 5 and 6 I have shown my invention as applied to control the flow of glass to a forehearth 12 of a glass feeder. In such a case I form an opening 13 in the roof of the forehearth through which the stopper can be inserted and removed, the opening being closed when the stopper is not in use by a tile 14.

When it is desired to stop the issue of molten glass from the flow opening, the gate block, if present, is raised and the stopper 15 is put down on the flow block 4ª, with its handle leaning away from the wall of the furnace 3, it is held in this position by the head 10 of the screw 11 adjustably carried in the end of a bracket 16 projecting from the upper part of the furnace.

The function of the gate block 5 is to act as an upper lip for the slot through which glass flows. By having the gate block movable away from the flow opening, it is possible to have the top of the flow opening 4 well above the glass line within the furnace, so that when the stopper 15 is placed in front of the flow opening, there will be considerable space above the molten glass through which the products of combustion can escape over the dammed glass, the amount of escape regulated by the inclination of the stopper. Thus when it is desired, the flow from the furnace can be started again by removing the stopper 15 by the metal handle 6. If the stopper used is of the combined gate block and stopper form as here shown in Figures 3 and 4, the stopper is then inserted within the lower bracket 8 and functions as a gate block on the resumption of flow from the furnace.

To carry out this invention, the furnace must have a flow opening of substantial height above the molten glass so that the products of combustion from within the furnace can escape over the molten glass through the flow opening and between the inclined stopper and the wall 3 of the furnace. In this manner, the viscosity of the glass can be regulated so that it will neither become hard nor will the viscosity be such that it will leak past the stopper.

However it may occur that after a prolonged stoppage the viscosity of the glass in contact with the stopper is such as to render it difficult to withdraw the stopper 15 by a simple traction on the handle 6. In that case, the stopper can be given a rocking motion by moving the handle towards the furnace wall, a motion which is not possible in arrangements where gates are placed vertically in front of the flow opening.

Having thus described my invention what I claim and desire to secure by Letters Patent is,—

The combination with a glass furnace having a flow opening in a vertical wall thereof, of a flow block projecting from below said opening, a stopper opposite said vertical wall having a lower edge seated on the flow block and having its upper end spaced away from the adjacent wall of the furnace, and means for varying the inclination of the stopper in respect to the wall of the furnace and for holding it at the desired inclination.

LOUIS BOUDIN.